(12) United States Patent
Benjamin (10) Patent No.: US 12,464,049 B2
(45) Date of Patent: *Nov. 4, 2025

(54) SYSTEMS AND METHODS FOR NETWORK DEVICE MANAGEMENT USING DEVICE CLUSTERING

(71) Applicant: Level 3 Communications, LLC, Broomfield, CO (US)

(72) Inventor: Michael Benjamin, Broomfield, CO (US)

(73) Assignee: Level 3 Communications, LLC, Denver, CO (US)

( * ) Notice: Subject to any disclaimer, the term of this patent is extended or adjusted under 35 U.S.C. 154(b) by 110 days.

This patent is subject to a terminal disclaimer.

(21) Appl. No.: 18/204,661

(22) Filed: Jun. 1, 2023

(65) Prior Publication Data

US 2023/0327954 A1 Oct. 12, 2023

Related U.S. Application Data

(63) Continuation of application No. 17/485,587, filed on Sep. 27, 2021, now Pat. No. 11,671,328, which is a
(Continued)

(51) Int. Cl.
*G06F 15/177* (2006.01)
*H04L 9/40* (2022.01)
*H04L 41/0681* (2022.01)
*H04L 41/069* (2022.01)
*H04L 41/082* (2022.01)
*H04L 41/0853* (2022.01)
*H04L 41/142* (2022.01)
*H04L 45/122* (2022.01)
*H04L 67/125* (2022.01)
*H04L 67/303* (2022.01)

(52) U.S. Cl.
CPC ........ *H04L 67/303* (2013.01); *H04L 41/0681* (2013.01); *H04L 41/069* (2013.01); *H04L 41/082* (2013.01); *H04L 41/0853* (2013.01); *H04L 41/142* (2013.01); *H04L 45/122* (2013.01); *H04L 63/20* (2013.01); *H04L 67/125* (2013.01)

(58) Field of Classification Search
CPC ............. H04L 41/0893; H04L 41/0681; H04L 41/069; H04L 41/082; H04L 41/0853; H04L 41/142; H04L 45/122; H04L 63/20; H04L 67/303
USPC ........................................ 709/221
See application file for complete search history.

(56) References Cited

U.S. PATENT DOCUMENTS

10,592,328 B1 3/2020 Thompson et al.
11,140,038 B2 * 10/2021 Benjamin ........... H04L 41/0681
(Continued)

*Primary Examiner* — Alan S Chou (57) ABSTRACT

Systems and methods for managing network devices include performing clustering operations for network devices based on attributes of the network devices. By comparing the results of subsequent clustering operations, changes in network device attributes can be readily identified and any network devices for which attributes have changed may be subject to further investigation or remedial action (e.g., blocking traffic to/from the network device). Clustering may also be used to conduct an inventory of network devices by identifying groups of network devices that have similar attributes.

11 Claims, 4 Drawing Sheets

Related U.S. Application Data continuation of application No. 16/682,796, filed on Nov. 13, 2019, now Pat. No. 11,140,038.

(60) Provisional application No. 62/778,761, filed on Dec. 12, 2018.

(56) References Cited

U.S. PATENT DOCUMENTS

| | | |
|---|---|---|
| 2008/0294684 A1* | 11/2008 | Chi ................... G06F 16/355 |
| | | 707/E17.046 |
| 2017/0019312 A1 | 1/2017 | Meyer et al. |
| 2018/0227210 A1* | 8/2018 | Cosgrove ............ H04L 41/0893 |
| 2019/0026174 A1 | 1/2019 | Basavarajappa |
| 2020/0195508 A1 | 6/2020 | Benjamin |
| 2020/0249931 A1* | 8/2020 | Garvey ................... G06F 8/60 |
| 2022/0014437 A1 | 1/2022 | Benjamin |

* cited by examiner

SYSTEMS AND METHODS FOR NETWORK DEVICE MANAGEMENT USING DEVICE CLUSTERING

CROSS-REFERENCE TO RELATED APPLICATION

This application is related to and claims priority under 35 U.S.C. § 119(e) from U.S. Patent Application No. 62/778, 761, filed Dec. 12, 2018, entitled "Systems and Methods for Network Device Management Using Device Clustering," the entire contents of which is incorporated herein by reference for all purposes.

TECHNICAL FIELD

The present disclosure relates to monitoring of devices within a network environment and, in particular, to systems and methods for providing device security and inventory management functions by monitoring device activity within a network.

BACKGROUND

The introduction of network connectivity to an increasing range of devices is providing an array of benefits. For example and among other things, such network connectivity allows consumers to track device usage and operation, to control or automate devices remotely, and to enable inter-device communication and functionality.

Despite the associated advantages, the proliferation of network-connectable devices nevertheless raises significant concerns regarding privacy and security. Moreover, as the number of such devices grows, it is increasingly difficult to identify and track how many and what type devices are connected to a given network.

It is with these observations in mind, among others, that aspects of the present disclosure were conceived.

SUMMARY

In one aspect of the present disclosure, a method of managing networked devices is provided and is executable with a processor coupled with a non-transitory computer readable medium having computer executable instructions thereon. The method includes generating a first set of device attributes for a first device, the first set of device attributes obtained from network traffic data associated with the first device, and generating a second set of device attributes for a second device, the second set of device attributes obtained from network traffic data associated with the second device. The method further includes applying, to each of the first set of device attributes and the second set of device attributes, a first clustering operation that assigns devices into clusters based on shared device attributes, the first clustering operation assigning each of the first device and the second device to a first cluster. The method then includes updating the second set of device attributes based on additional network traffic data associated with the second device and applying a second clustering operation that assigns the second device to a second cluster different than the first cluster. The method then includes initiating a responsive action corresponding to the second device in response to determining the second clustering operation assigns the second device to the second cluster.

In another aspect of the present disclosure, a method of generating an inventory of networked devices is provided and is executable with a processor coupled with a non-transitory computer readable medium having computer executable instructions thereon. The method includes generating a first device record for a first device, the first device record including a first set of device attributes obtained from network traffic data associated with the first device and supplemental device information for the first device, and generating a second device record for a second device, the second device record including a second set of device attributes obtained from network traffic data associated with the second device. The method further includes applying, to each of the first set of device attributes and the second set of device attributes, a clustering operation that assigns devices into clusters based on shared device attributes, the clustering operation assigning each of the first device and the second device to a same cluster. The method also includes inserting the supplemental device information of the first device into the second device record in response to the first device and the second device being assigned to the same cluster.

In yet another aspect of the present disclosure, a method of managing networked devices is provided. The method is executable by a processor coupled with a non-transitory computer readable medium having computer executable instructions and includes clustering a first device and a second device into a first cluster based on shared device attributes. The clustering is applied to a first set of device attributes for the first devices that are obtained from network traffic data associated with the first device and a second set of device attributes for the second device, the second set of device attributes obtained from network traffic data associated with the second device. The method further includes modifying the second set of device attributes based on additional network traffic data associated with the second device and clustering the second device into a second cluster different than the first cluster based on the modified second set of device attributes. The method also includes initiating a responsive action corresponding to the second device in response to clustering the second device into the second cluster.

DETAILED DESCRIPTION

Developments in computing technology have resulted in a rapid proliferation of network-connectable devices. In addition to conventional computing devices, such devices now include a wide range of "smart" devices. Vehicles, appliances, home automation devices, in-home assistants, and the like are a small sampling of the many devices commonly referred to collectively as the "Internet of Things" or IoT.

Although IoT devices can provide significant convenience, improved efficiency, and other benefits, there are several issues related to large-scale adoption of such devices. For example, not all devices may include adequate security measures and, as a result, may present opportunities for hackers or other malicious actors to access and modify the behavior of such devices. In some cases, hackers may further use such devices as entry points into otherwise secured networks. Other issues relate to identifying and characterizing devices that may be connected to a given network at any given time. More specifically, as the number and variety of devices connected to a network grows, the complexity of reliably identifying which devices are in communication with the network and the characteristics of those devices grows.

In light of the foregoing, systems and methods according to the present disclosure provide improved security and inventory functionality by monitoring network traffic associated with networked devices and attributes of such network traffic. More specifically, traffic within a network is analyzed to discover devices within the network and to determine attributes of the traffic associated with the devices. Based on the network traffic attributes, the discovered devices are assigned to clusters or groups which may then be used to facilitate various security- and inventory-related functions.

In implementations of the current disclosure, discovered devices are assigned to particular clusters based on the attributes of their associated network traffic. Accordingly, discovered devices within a given cluster exhibit substantially the same, or at least very similar, attributes. For example, the devices within a cluster may generate network traffic of the same size, at the same frequency, and directed to the same destination address or group of addresses. Based on such similarities, devices assigned to a particular cluster may be considered different instances of the same device or related devices.

Security-related functions are facilitated by using the device clustering to establish baseline attributes from which subsequent deviation may be identified. For example, an initial set of network traffic for a group of discovered devices may be used to establish an initial clustering of the devices. As additional network traffic is obtained and analyzed, one or more devices of a given cluster may be migrated to a different cluster or spun off into a new cluster, thereby indicating a change in attributes of the migrated devices. Depending on the nature of the observed change, various responsive actions may be taken. For example and without limitation, in cases where the new clustering is indicative of migrated devices malfunctioning, being compromised (e.g., hacked), or otherwise behaving unexpectedly, an alarm or log entry may be generated, the anomalous devices may be disconnected from the network, one or more network components may be reconfigured to block traffic from the migrated devices or to disable ports associated with the migrated devices, or other similar actions directed to mitigating or eliminating potential threats posed by the migrated devices may be undertaken. The system may also be configured to determine when a device migration is indicative of legitimate activity. For example, deployment of a patch or similar update may cause a given cluster to split. Depending on the number of devices migrated to a new cluster, the degree of change observed in the attributes of the devices, or other factors, the system may recognize the change in clustering as benign and take no responsive action.

Clustering may also facilitate in identifying and inventorying devices within a given network. As previously noted, the general process of clustering described herein generally involves discovering devices within a network and then grouping the discovered devices based on similar device attributes. Notably, specific details regarding the discovered devices (such as their type, make, model, manufacturer, etc.) may be unknown because such information is generally not included in network traffic. Accordingly, provided identifying information for at least one device of a given cluster is available or known, the system may be configured to apply similar information to other devices within the same cluster. So, for example, the system may be provided with a manufacturer, model number, and various specifications for a known smart thermostat in the network and for which network traffic is collected. After devices of the network have been clustered, including the known smart thermostat, the same manufacturer, model number, and specifications of the known thermostat may be applied to other devices assigned to the same cluster as the known thermostat. Using a similar approach for other devices, the system may generate or otherwise facilitate generation of an inventory of the devices within a network.

Additional details and features of implementations of the present disclosure are now provided in detail with reference to the figures.

Figure 1:
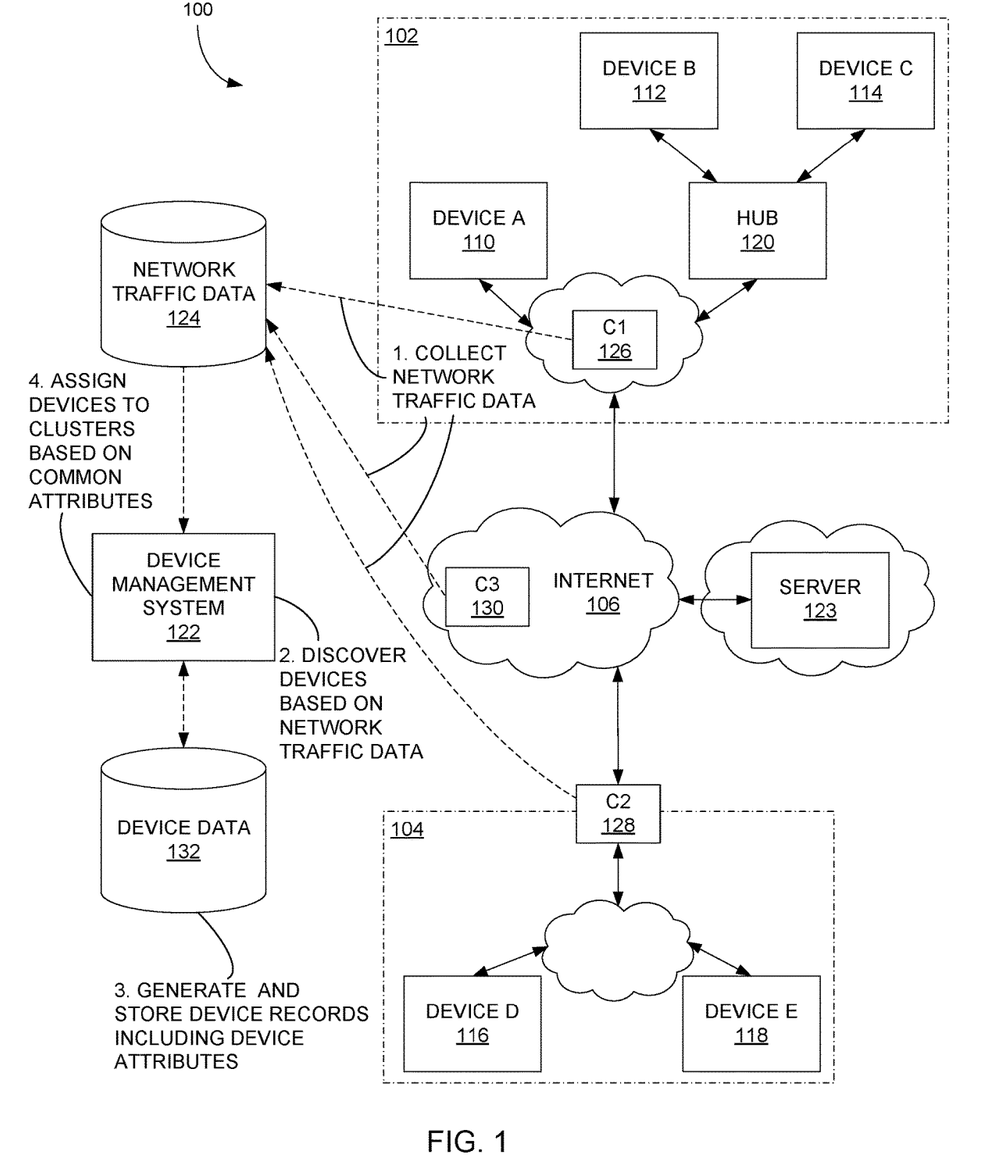
FIG. 1 is an example network environment including a device management system for clustering devices based on network traffic and performing other functions based on such clustering.

FIG. 1 is a block diagram of an example network environment 100. As illustrated, the network environment 100 includes each of a first network 102 and a second network 104, each of which is in communication with the Internet 106, or a similar broader network. The first network 102 includes devices A to C 110-114 with devices B and C 112, 114 being coupled to a device hub 120. Similarly, the second network 104 includes each of devices D and E 116, 118. Devices A to E 110-118 are intended to represent any device that may be connected to and communicate over a network, such as networks 102 and 104 and/or the Internet 106. However, in at least one implementation of the current disclosure, at least one of devices A to E is configured to communicate with a server 123 via the Internet 106.

It should be appreciated that the networks 102 and 104 and devices A to E 110-118 are intended as an illustrative example only and are provided for purposes of context. Accordingly, in other implementations of the present disclosure, more or fewer than the networks 102 and 104 and devices A to E 110-118 may be included. Similarly, while illustrated in FIG. 1 as having particular network architecture, it should be appreciated that implementations of the present disclosure are not necessarily limited to the architecture illustrated in FIG. 1 and are more broadly applicable to any network environment unless otherwise specified.

Devices A to E 110-118 may be any network-connectable devices, however, systems and methods according to the present disclosure are particularly useful for providing improved security and inventory functionality for so-called Internet of Things (IoT) devices. For purposes of the present disclosure, IoT devices include devices embedded with technology that enables network connectivity and communication of devices other than standard computing devices such as desktops, laptops, tablets, and smartphones. IoT devices generally allow for remote control and/or monitoring but may lack some of the functions or features of conventional computing devices. Examples of IoT devices include so-called "smart" versions of, among other things, heating and air conditioning systems, lighting systems, thermostats, vehicles, appliances, security systems, speakers, alarm clocks, vending machines, and the like. Nevertheless, while implementations of the present disclosure are useful when devices A to E 110-118 are IoT devices, it should be appreciated that the systems and methods disclosed herein are more generally applicable to implementations in which devices A to E 110-118 are any devices capable of networked communication, including the standard computing devices identified above.

Implementations of the current disclosure include the collection and storage of network traffic data. To facilitate collection of such data, one or more collectors may be distributed throughout a given network environment. Each data collector may be a standalone device or may correspond to a network device with integrated network traffic data collection and analysis functionality. As one non-limiting example, the network traffic data may be in the form of NetFlow data and each data collector may be a router, switch, gateway, or similar network device with integrated NetFlow data collection functionality. The network environment 100 includes multiple collectors to illustrate various possibilities for placement of collectors in implementations of the present disclosure. More specifically, a first collector C1 126 disposed within the first network 102 that collects and analyzes network traffic and generates network traffic data for traffic within the first network 102. A second collector C2 128 is disposed at an edge of the second network and, as a result, may collect and analyze network traffic entering and exiting the second network 104. A third collector C3 130 is also included within the Internet 106 to illustrate collection and analysis of network traffic as such traffic is communicated over the broader Internet 106.

Data collected by each of the collectors 126-130 may be stored in a network traffic data source 124 for access by a device management system 122. In certain implementations, the collected data is first transmitted to the device management system 122 which manages storage in the network traffic data source 124. Alternatively, one or more other computing systems may be implemented to collect and store data obtained by the collectors 126-130.

The network traffic data collected and stored in the network traffic data source 124 may include various information and attributes for packets passed through each of the collectors 126-130. For example and without limitation, the network traffic data for a given packet may include a source address, a destination address, a port, a protocol, a packet size, and a timestamp. The network traffic data may also include information derived from such information. For example and among other things, a transmission frequency may be calculated for a given source address by comparing the timestamps of consecutive packets from a particular source address.

Instances of devices, such as IoT devices, within a network may exhibit similar attributes regardless of where they are located within a network. For example, a smart thermostat from a particular manufacturer may be configured to communicate with one or more servers operated by the manufacturer to provide cloud-based services. Although such thermostats may be dispersed geographically and logically within a network, each may be configured to communicate with the manufacturer's servers in a consistent manner. For example, each of a particular model of thermostat from a particular manufacturer may be configured to transmit packets to one or more known IP addresses at a particular interval with each packet having a particular size, format, etc. Accordingly, by analyzing characteristics of network traffic data, instances of a given thermostat model within a network may be identified.

With the foregoing in mind, the device management system 122 is configured to process collected network traffic data, to discover devices based on the collected network traffic data, and to group or cluster the discovered devices based on common characteristics of the network traffic data of the discovered devices. To do so, the device management system 122 first discovers devices within the network environment 100 from the network traffic data. For example, the device management system 122 may consider each unique source IP address within the network traffic data to correspond to a respective device. The device management system 122 may then sort or group the network traffic data based on source IP to identify the network traffic data associated with each discovered device. The network traffic data associated with each device may then be processed by the device management system 122 to generate a profile or similar set of features/attributes for the device. Such information may be stored by the device management system 122 in a device data source 132.

In certain cases, source IP address may not uniquely identify a single device. Such cases are discussed below in further detail with alternative approaches to identifying unique devices within a network. Nevertheless, for purposes of the current discussion, it is assumed that source IP addresses are sufficient to identify unique devices within the network and, as a result, source IP addresses may be used as unique identifiers for each device.

At this point in the processing of the network traffic data by the device management system 122, the device management system 122 has discovered a collection of devices and has summarized the attributes of those devices according to corresponding network traffic data. Based on the attributes of the devices, the device management system 122 may then perform a clustering operation on the devices. In other words, the device management system 122 examines the attributes of each discovered device and determines which other discovered devices have similar attributes. Similar devices are then assigned to a particular device cluster. The cluster to which a given device is assigned may be stored, such as in the form of an alphanumeric identifier, in the device data source 132 and associated with the device.

Although other methods may be used to cluster discovered devices, in at least one implementation, the device management system 122 clusters discovered devices using k-means clustering. k-means clustering is a method of vector quantization that is often used to cluster data during data mining. k-means clustering partitions n observations (here the entries of the device data source 132) into k clusters in which each observation belongs to the cluster with the nearest mean, which serves as a prototype of the cluster. When applied, k-means clustering results in a partitioning of the data space into cells, which, in the implementations of the present disclosure, are associated with different devices.

The device management system 122 may make use of the clustering in various ways, including providing each of security and inventory functionality. With respect to security, an initial clustering performed by the device management system 122 may be considered a baseline to which the results of subsequent clustering operations may be compared. To the extent devices are clustered differently in subsequent clustering operations, such changes may be indicative of a behavioral change in the device and, as a result, a potential compromise of the device. For example, if a particular device within a cluster begins transmitting to a different IP address, changes the size and type of data it transmits, or otherwise modifies its behavior, the device may be placed in a different cluster than that within which the device is placed during baseline clustering. By monitoring for such differences, the device management system 122 may identify devices within the network that have exhibited behavioral changes indicative of the device malfunctioning, having been hacked, or otherwise becoming compromised.

It should be appreciated that not all changes in clustering of devices correspond to malicious activity. For example, some changes may result from updates being deployed and implemented at only a subset of the instances of a particular device within the network. Accordingly, in certain implementations, clustering changes may be further analyzed to determine whether such changes are indicative of actual threats or are the result of other, legitimate activity.

In one example, the proportion of devices within a first cluster that migrate to a second cluster may be determined. If the proportion is relatively high, indicating that many devices underwent a similar change, the cause may be deployment of a patch or upgrade. In contrast, if only one or a relatively small number of devices migrate to the new cluster, then the source of the change is more likely specific to those devices and may indicate that those few devices have been compromised and responsive action should be taken. As another example, the distance between the centroid of a device's original cluster and that of its new cluster may be used to determine whether responsive action should be taken. For example, if the new centroid is relatively close to the original centroid, then the behavioral change of the device may be considered relatively minimal and therefore, benign. In contrast, more disparate centroids are indicative of a more significant shift in device behavior and, as a result, may warrant investigation or responsive action.

In the event the device management system 122 determines that a device is compromised, the device management system 122 may initiate various responsive actions. In one example implementation, the device management system 122 may trigger an alarm and/or generate a log entry that includes information regarding the suspect device, such as the device's IP address and summary information regarding the conditions that caused the alarm or log entry to be generated. The device management system 122 may also initiate processes to isolate the device or otherwise block traffic from the suspect device. For example and among other things, the device management system 122 may initiate disconnection of the device from the network (e.g., by disabling a port of a network device to which the device is connected), may reconfigure one or more network devices to redirect traffic received from the suspect device, or may reconfigure one or more network devices to filter or sink traffic from the compromised device.

In addition to security functions, clustering devices by the device management system 122 may facilitate in performing an inventory of devices within a network. As previously noted, the device management system 122 discovers devices within a network and groups those discovered devices according to their attributes as determined from collected network traffic data. To the extent network traffic data is relied upon for such discovery and grouping, the network traffic data may not carry characteristics of the device, which may include, among other things, the specific make, model, brand, or type of device. As a result, in certain implementations, the discovered and clustered devices may be anonymous despite their presence and general behavior being known. Nevertheless, clustering may be leveraged to associate discovered devices with device characteristics. More specifically, to the extent device characteristics are known for at least one device within a cluster, such characteristics may be applied to other devices within the cluster.

In one example implementation, an operator of the device management system 122 may build a profile for a known device in the device data source 132 that includes device characteristics. For example, the operator may add the known device to the network and supplement any attributes of the device generated by the device management system 122 with the device characteristics. Accordingly, when the known device is clustered with discovered but anonymous devices exhibiting similar behavior, the device characteristics of the known device may be applied to those other devices. In other implementations, similar profiles including device characteristics may be provided to the operator of the device management system 122 by other parties including device users and device manufacturers.

As previously noted, the process of discovering devices generally includes identifying unique devices within the network environment. In the case of devices to which a public IP address is assigned, the source IP address of network traffic received from such devices uniquely identified the device. However, in certain cases, the source IP address of a packet may not be uniquely associated with a particular device. For example, the source IP address of a device within a private network is not necessarily unique as such IP addresses may be reused in other private networks. Similarly, packets exchanged between a private network and a public network, such as the Internet, may include a source IP address of a gateway or similar border device of the private network as opposed to the device within the private network from which the packet originated. As yet another example, and as illustrated by devices B and C 112, 114 and hub 120, a device may be coupled to a hub or similar central device that facilitates and, as a result, the source IP address may be that of the hub.

Each of the foregoing issues may be addressed in different ways based on where network traffic data is collected. For example, if network traffic from a device in a private network (such as device A 110) is collected within a public network (such as by collector C3 130), the collector or the device management system 122 may communicate with a computing system of an Internet Service Provider (ISP) to obtain additional information. More specifically, based on the collected information for a packet, the ISP may point to a specific IP address within the ISP managed network from which the packet was received. To the extent the specific IP address does not correspond to the originating device, a similar operation in which the collected information is submitted to a corresponding computing system may be repeated to effectively "drill-down" into the network and identify the origin of the packet.

In instances in which network traffic data is collected within a private network (such as by collector C1 126), the collector may be configured to automatically insert a unique identifier into the collected network traffic data. For example, the collector may store or have access to a table that correlates private IP addresses (which may be locally unique but used in other private networks) to globally unique identifiers. The collector may then insert the globally unique identifier into the network traffic data.

Insertion of additional data may also be used to resolve the issue of devices connected to a hub. More specifically, a collector may be configured to insert additional device information into the network traffic data it collects. For example and among other things, the collector may be configured to retrieve a media access control (MAC) address of a device; may perform a scan of the device to obtain port, service, banner information, or other data from the device; may "sniff" packets from the device to determine additional information regarding the contents of packets transmitted by the device; or may determine what type of encryption, if any, has been applied to the contents of the packet. Any such additional information obtainable by the collector may be added to the network traffic information for subsequent analysis and device clustering by the device management system 122.

Although the foregoing description focused primarily on wired devices having static IP addresses, implementations of the current disclosure are not limited to such devices. For example, in certain implementations, the devices for which network traffic is collected and that are subsequently clustered by the device management system 122 may be wireless or mobile devices or may be devices that use dynamic IP addresses. In such implementations, identification of the device may be accomplished by collecting and inserting additional information associated with the device into the collected network traffic data that uniquely identifies the device. As previously discussed, examples of such data may include, without limitation and among other things, MAC address information; port, service, or banner information; and data obtained by sniffing packets from the device.

Also, while the current disclosure primarily discusses devices that communicate using Internet Protocol, the systems and methods described herein may also be expanded to include other communication protocols and communication technologies, such as Bluetooth, Zigbee, ANT/ANT+, Wi-Fi, etc. In certain implementations, communication with and identification of such devices may be facilitated by intermediate devices to which such devices connect and communicate, such as previously described in the context of device hubs.

Figure 2:
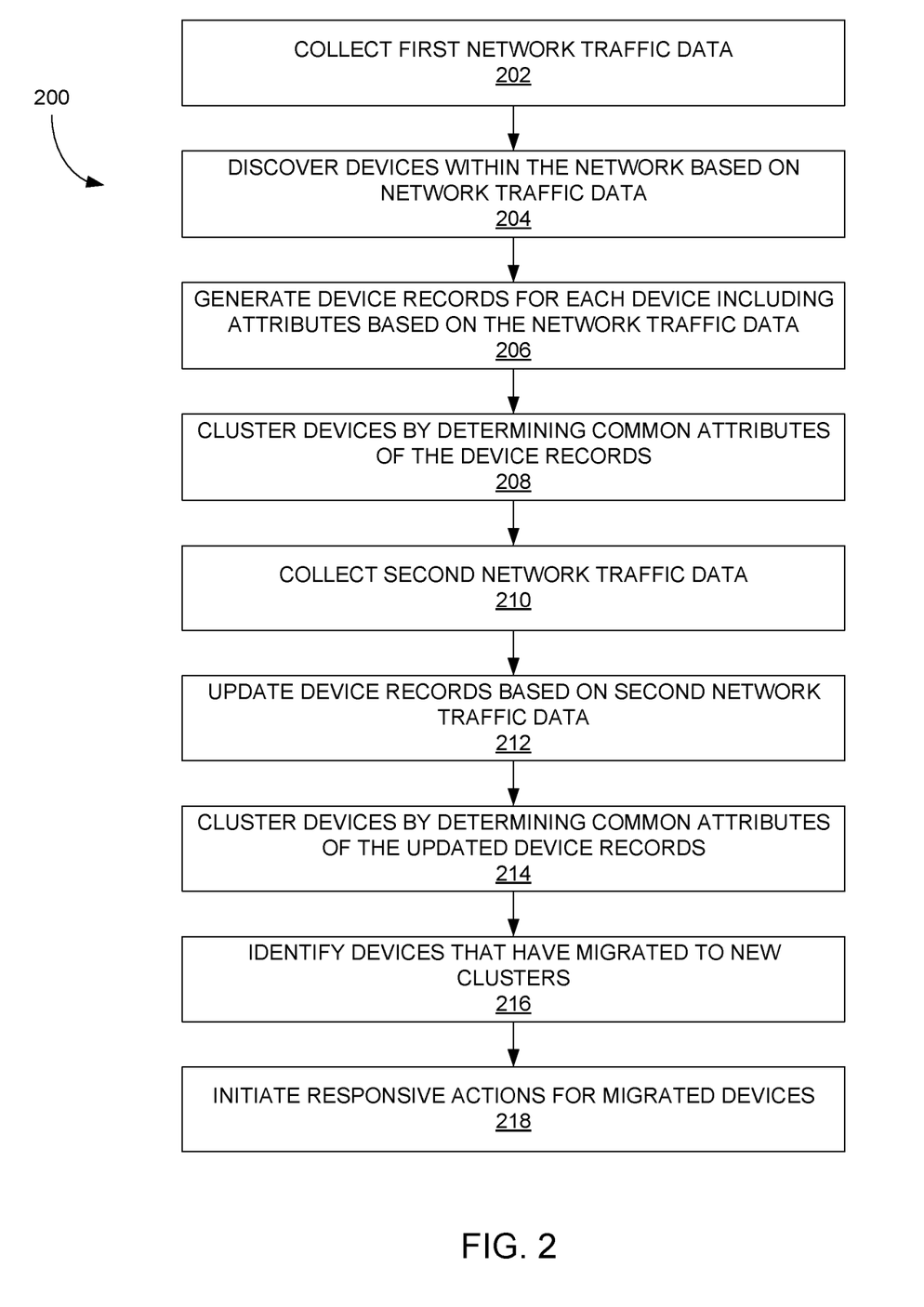
FIG. 2 is a flow chart illustrating a method for identifying compromised devices based on changes in device clusters.

FIG. 2 is a flow chart illustrating a method 200 for managing devices within a network and, in particular, a method for identifying anomalous device behavior that may be indicative of a malfunction or malicious activity. In general, the method 200 includes collecting network traffic data, identifying devices from the network traffic data, and performing a clustering of the identified devices based on the network traffic data. After an initial clustering, the results of subsequent clustering operations using updated network traffic data may be used to identify devices for which behavior has changed as indicated by changes in the network traffic data associated with such devices. Upon identifying such devices, various responsive actions may be initiated, including disconnection of the device or blocking of traffic from the device. To provide context, the foregoing discussion of method 200 includes reference to the network environment 100 of FIG. 1 and its components.

At operation 202, network traffic data is collected. As illustrated in FIG. 1, collection of network traffic data may be performed by network traffic data collectors, such as collectors C1-C3 126-128, which may be distributed throughout the network environment 100. For example, collector C1 126 is disposed within network 102 (which may be a private network), collector C2 128 is illustrated as a border device and collects network traffic data for traffic exchanged with network 104, and collector C3 130 is disposed to collect network traffic data for traffic passed through the Internet 106 or similar public network. In one example implementation, each of the collectors C1-C3 126-128 transmits its collected data to a network traffic data source 124.

At operation 204, the collected network traffic data is used to discover devices within the network environment 100. For example, the device management system 122 may access the stored network traffic data stored in the network traffic data source 124 during operation 202 and may analyze the collected data to identify individual sources of traffic. As discussed above, identification of such devices may include identifying unique source IP addresses within the network traffic data. However, in cases where devices are within private networks or coupled to hubs or other devices or where a source IP address may not be uniquely assigned or available, additional information may be required to identify each unique device. As previously discussed, such information may be injected into the network traffic data by the collectors 126-130, may be provided or accessed from other computing systems associated with ISPs or network operators, or otherwise made available to the device management system 122.

At operation 206, the device management system 122 may generate device records for each device identified in operation 204. In general, the process of generating device records includes identifying the network traffic data (and any supplemental data that may be collected by the collectors 126-130 or otherwise available to the device management system 122) associated with each device identified in operation 204 and aggregating the network traffic data corresponding to each device. In certain cases, the device records may include information as included in the network device data, however, the device records may also include information derived from the network device data. Examples of such derivative information include, without limitation, an average packet size, collections of destination IP addresses, and transmission frequency.

At operation 208, the device management system 122 performs a clustering operation using the device records. As previously described in the context of FIG. 1, clustering generally involves analyzing the device records to identify common attributes shared by multiple devices and grouping the devices based on the shared attributes. The clustering operation culminates in each of the devices being assigned to a cluster with each cluster including devices exhibiting substantially the same or similar attributes. Based on this similarity, it may be assumed that each device within a given cluster is a different instance of the same device type or device family. Accordingly, the initial clustering performed by the device management system 122 may be used to establish a baseline or similar standard for the behavior of devices of the same type within the network environment 100. In certain implementations, clustering may be stored as a cluster identifier or similar value within the device record associated with each device.

As noted above, the clustering operation may be conducted such that devices included in a given cluster have substantially the same or at least similar attributes. The degree of similarity between devices in a given cluster may vary and/or may be modifiable. For example, in implementations in which the device management system 122 implements k-means clustering (or a similar clustering technique), the degree of similarity for a cluster may be determined, at least in part, by a maximum closeness value. By increasing the maximum closeness value for the clustering operation, the size of the clusters can be increased such that there is greater variability across devices in a given cluster (i.e., clustering will be more permissive and will group less similar devices together). Similarly, by decreasing the maximum closeness value for the clustering operation, the size of the clusters can be decreased such that there is less variability across devices in a given cluster (i.e., clustering will be more strict and will require greater similarity to group devices together). Such tuning may be used to adjust the performance of the device management system 122 to reflect security requirements and resource availability, among other things. For example, in applications in which security is a high priority, the maximum closeness value may be set to a relatively low value such that the device management system 122 identifies and alerts on relatively small changes in device behavior. In contrast, in applications in which resources may be limited and/or security is less of a concern, the maximum closeness value may be set relatively high such that the device management system 122 will alert only on significant changes in device behavior.

At operation 210, additional network traffic data is collected and at operation 212, the device management system 122 updates the device records in light of the additional network traffic data. As part of updating the device records, the device management system 122 may add new records corresponding to new devices added to the network environment 100, may delete records corresponding to devices that have been removed from the network environment 100, and/or may update existing records and their respective attributes for devices that have remained within the network environment 100.

At operation 214, the device management system 122 performs a second clustering operation using the updated device records. Similar to operation 208, such clustering groups the devices based on the attributes of their respective device records such that devices with substantially the same or at least similar attributes are assigned to the same cluster.

At operation 216, the device management system 122 analyzes the new clustering to identify devices that have migrated to new clusters. In other words, the device management system 122 determines the devices for which the second network traffic data indicates a deviation in behavior from that indicated by the network traffic data collected in operation 202. To determine whether the migration is attributable to the device being compromised or is the result of legitimate device activity (e.g., the deployment of a patch or similar update), the device management system 122 may further analyze the migration patterns of devices in response to the second network traffic data. Among other things, the device management system 122 may analyze the number or proportion of similar devices that have made the same migration or the distance between the centroids of the original and subsequent clusters. As previously discussed, such analysis may be used to determine if a change in the device's behavior is likely due to the device being compromised and, as a result, whether corresponding responsive action should be initiated.

At operation 218, one or more responsive actions may be initiated in response to determining the migrated devices may be compromised. Such responsive actions may include the generation of an alarm, log entry, or similar communication. Responsive actions may also include reconfiguring devices within the network environment 100 to disconnect the suspect device, to block or redirect traffic from the suspect device, or to increase monitoring of traffic from the suspect device.

The foregoing process of obtaining network data, identifying devices, clustering the identified devices, and identifying changes in the clustering from previous iterations may be periodically repeated. By doing so, changes in device behavior may be readily identified and responsive actions implemented for any suspect activity, thereby improving overall security of the network environment 100. The foregoing method also improves overall performance of the network environment 100 in various ways. For example, traffic associated with malicious activity may be reduced or eliminated, thereby freeing network resources for legitimate traffic. As another example, malfunctioning, outdated, or otherwise incorrectly operating devices can be readily identified for replacement or repair.

Figure 3:
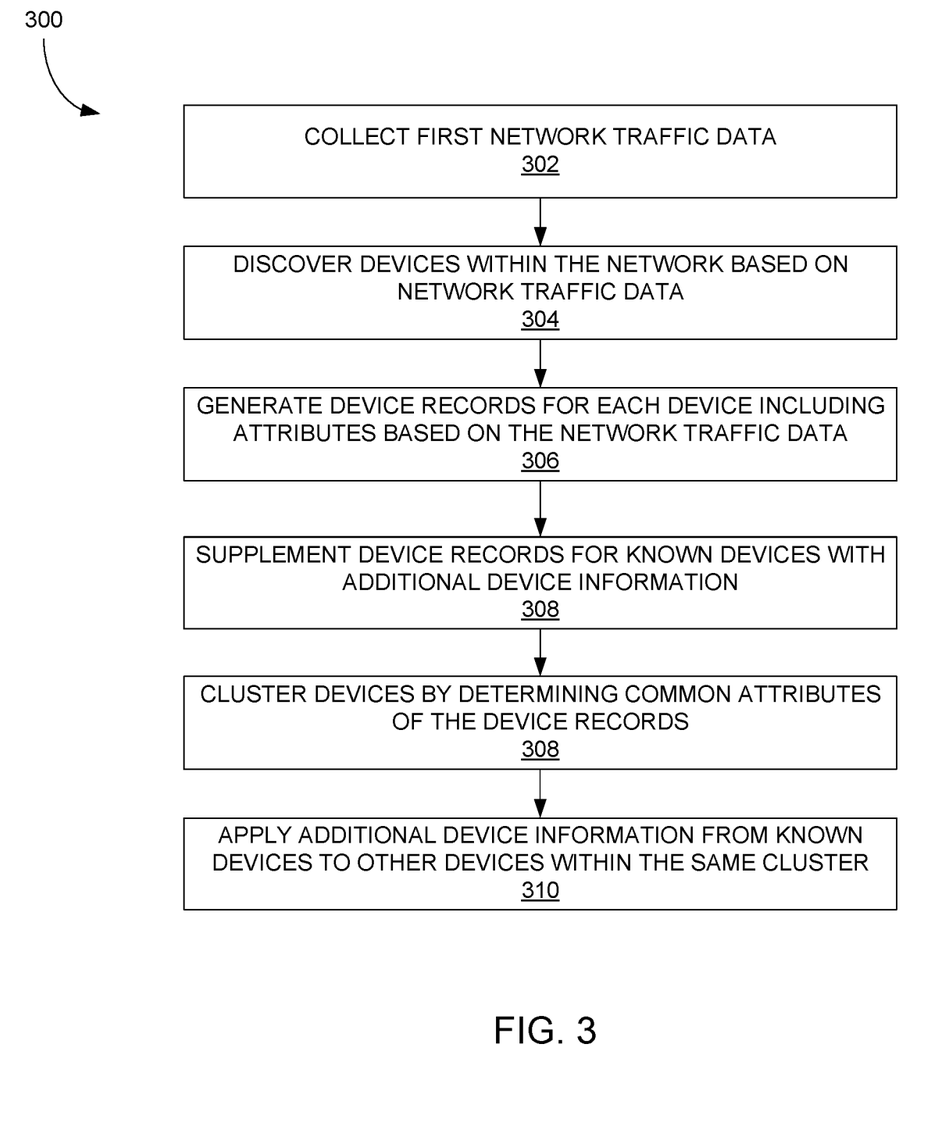
FIG. 3 is a flow chart illustrating a method for generating an inventory of networked devices that leverages clustering of such devices.

FIG. 3 is a flow chart illustrating a method 300 for performing device inventory for a network. In general, the method 300 includes collecting network traffic data, identifying devices from the network traffic data, and performing a clustering of the identified devices based on the network traffic data. After clustering, device information for known devices within each cluster may be copied to or otherwise applied to other devices within the same cluster. Again, to provide context, the foregoing discussion of method 300 includes reference to the network environment 100 of FIG. 1 and its components.

At operation 302, network traffic data is collected. As illustrated in FIG. 1 and similar to operation 202 of the method 200 of FIG. 2, collection of network traffic data may be performed by network traffic data collectors which may then transmit the collected data to a network traffic data source 124.

At operation 304, the collected network traffic data is used to discover devices within the network environment 100. Similar to operation 204, the device management system 122 may access the stored network traffic data and may analyze the collected data to identify individual sources of traffic, which may include identifying unique source IP addresses within the network traffic data and/or may further include identifying the devices based on additional device information obtained by the collectors or otherwise accessible by the device management system 122.

At operation 306, the device management system 122 may generate device records for each device identified in operation 304, such as by identifying the network traffic data (and any supplemental data that may be collected by the collectors 126-130 or otherwise available to the device management system 122) associated with each device identified in operation 304 and aggregating the network traffic data corresponding to each device.

At operation 308, at least one of the device records generated in operation 306 is supplemented with additional device information. Such device information may be provided by an operator of the device management system 122 or any third party (e.g., a device manufacturer or device user). Device information may include, but is not limited to a device type, a device manufacturer, a device model, or device specifications. More generally, however, device information may be any information of a device that may not be readily ascertained or available from network traffic data.

At operation 308, the device management system 122 performs a clustering operation using the device records. As previously described in the context of FIGS. 1 and 2, clustering generally involves analyzing the device records to identify common attributes shared by multiple devices and grouping the devices based on the shared attributes.

At operation 310, the device management system 122 supplements at least a portion of the device records using the additional device information obtained in operation 308. More specifically, the device management system 122 identifies each cluster to which devices having additional device information have been assigned. For each other device in such clusters, the device management system 122 copies or otherwise inserts the additional device information into the respective device records. In other words, the device management system 122 assumes that each device within the clusters generated in operation 308 are substantially the same and, as a result, the additional device information may be applied equally to each device within a given cluster, thereby more thoroughly identifying and characterizing any devices determined to be included in the network in operation 304.

Figure 4:
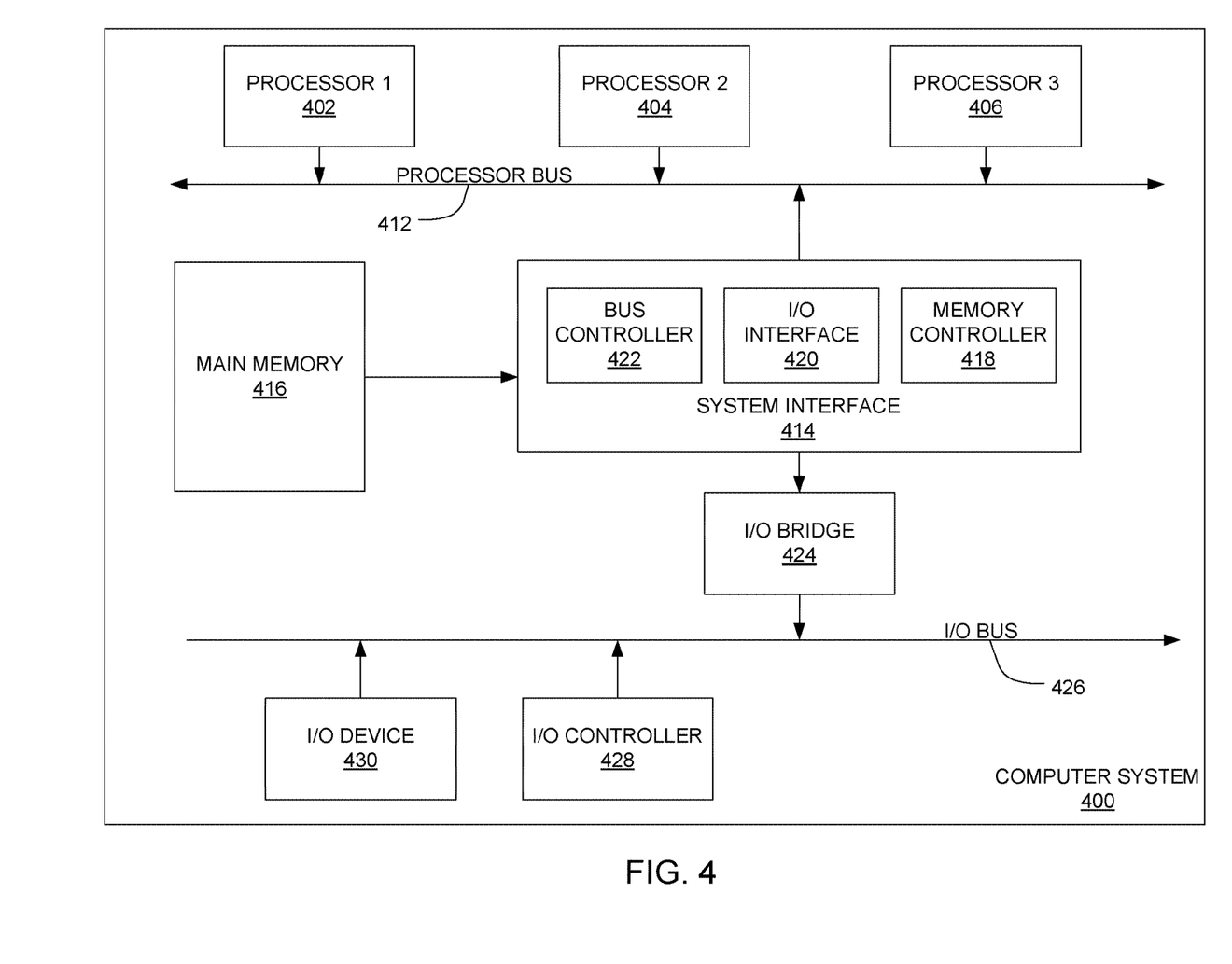
FIG. 4 is a diagram illustrating an example of a computing system which may be used in implementing embodiments of the present disclosure.

FIG. 4 is a block diagram illustrating an example of a computing device or computer system 400 which may be used in implementing the embodiments of the network disclosed above. In particular, the computing device of FIG. 4 is one embodiment of the server or other networking component that performs one of more of the operations described above. The computer system (system) includes one or more processors 402-406. Processors 402-406 may include one or more internal levels of cache (not shown) and a bus controller or bus interface unit to direct interaction with the processor bus 412. Processor bus 412, also known as the host bus or the front side bus, may be used to couple the processors 402-406 with the system interface 414. System interface 414 may be connected to the processor bus 412 to interface other components of the system 400 with the processor bus 412. For example, system interface 414 may include a memory controller 418 for interfacing a main memory 416 with the processor bus 412. The main memory 416 typically includes one or more memory cards and a control circuit (not shown). System interface 414 may also include an input/output (I/O) interface 420 to interface one or more I/O bridges or I/O devices with the processor bus 412. One or more I/O controllers and/or I/O devices may be connected with the I/O bus 426, such as I/O controller 428 and I/O device 430, as illustrated.

I/O device 430 may also include an input device (not shown), such as an alphanumeric input device, including alphanumeric and other keys for communicating information and/or command selections to the processors 402-406. Another type of user input device includes cursor control, such as a mouse, a trackball, or cursor direction keys for communicating direction information and command selections to the processors 402-406 and for controlling cursor movement on the display device.

System 400 may include a dynamic storage device, referred to as main memory 416, or a random access memory (RAM) or other computer-readable devices coupled to the processor bus 412 for storing information and instructions to be executed by the processors 402-406. Main memory 416 also may be used for storing temporary variables or other intermediate information during execution of instructions by the processors 402-406. System 400 may include a read only memory (ROM) and/or other static storage device coupled to the processor bus 412 for storing static information and instructions for the processors 402-406. The system set forth in FIG. 4 is but one possible example of a computer system that may employ or be configured in accordance with aspects of the present disclosure.

According to one embodiment, the above techniques may be performed by computer system 400 in response to processor 404 executing one or more sequences of one or more instructions contained in main memory 416. These instructions may be read into main memory 416 from another machine-readable medium, such as a storage device. Execution of the sequences of instructions contained in main memory 416 may cause processors 402-406 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 416. Common forms of machine-readable media may include, but are not limited to, magnetic storage media; optical storage media; magneto-optical storage media; read only memory (ROM); random access memory (RAM); erasable programmable memory (e.g., EPROM and EEPROM); flash memory; or other types of media suitable for storing electronic instructions.

Embodiments of the present disclosure include various operations, which are described in this specification. The operations may be performed by hardware components or may be embodied in machine-executable instructions, which may be used to cause a general-purpose or special-purpose processor programmed with the instructions to perform the operations. Alternatively, the operations may be performed by a combination of hardware, software, and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

I claim:

1. A method of managing networked devices, the method comprising:
   with a processor coupled with a non-transitory computer readable medium having computer executable instructions:
   generating a first set of device attributes for a first device, the first set of device attributes obtained from network traffic data associated with the first device;
   generating a second set of device attributes for a second device, the second set of device attributes obtained from network traffic data associated with the second device;
   applying, to each of the first set of device attributes and the second set of device attributes, a first clustering operation that assigns devices into clusters based on shared device attributes, the first clustering operation assigning each of the first device and the second device to a first cluster;
   updating the second set of device attributes based on additional network traffic data associated with the second device;
   applying a second clustering operation that assigns the second device to a second cluster different than the first cluster; and
   in response to determining the second clustering operation assigns the second device to the second cluster, initiating a responsive action corresponding to the second device.

2. The method of claim 1, wherein each of the first clustering operation and the second clustering operation is a k-means clustering operation.

3. The method of claim 1, wherein the first set of device attributes and the second set of device attributes include at least one of a source address, a destination address, a port, a protocol, a packet size, a timestamp, and a transmission frequency.

4. The method of claim 1, wherein the initiation of the responsive action is further in response to determining a first centroid of the first cluster is at least a distance from a second centroid of the second cluster.

5. The method of claim 1, wherein the initiation of the responsive action is further in response to determining a third device assigned to the first cluster by the first clustering operation was not assigned to the second cluster by the second clustering operation.

6. The method of claim 1, wherein the first set of device attributes and the second set of device attributes further include supplemental data acquired and inserted by devices configured to capture the network traffic data.

7. The method of claim 6, wherein the supplemental data includes at least one of a media access control (MAC) address, a port, a service identifier, banner information, packet content, and an encryption type.

8. The method of claim 1, wherein the responsive action includes one of generating an alert and generating a log entry indicating the second device has been assigned to the second cluster.

9. The method of claim 1, wherein the responsive action includes reconfiguring a network device to disable a port of the network device in communication with the second device.

10. The method of claim 1, wherein the responsive action includes reconfiguring a network device to at least one of reroute traffic received by the network device from the second device or block traffic received by the network device from the second device.

11. The method of claim 1 further comprising, with the processor, obtaining the network traffic data associated with the first device and the network traffic data associated with the second device, wherein the network traffic data associated with each of the first device and the second device is collected by and provided to the device management system by one or more network data collectors of a network environment including each of the first device and second device.

* * * * *